United States Patent
Huberman et al.

(10) Patent No.: US 10,349,221 B1
(45) Date of Patent: Jul. 9, 2019

(54) METHOD AND SYSTEM FOR MOBILE DEVICE PROCESSING TIMEOUT BASED LOCALIZATION

(71) Applicant: MAPSTED CORP., Mississauga (CA)

(72) Inventors: Sean Huberman, Guelph (CA); Eros Gulo, Woodbridge (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/155,892

(22) Filed: Oct. 10, 2018

(51) Int. Cl.
| | |
|---|---|
| G01C 21/20 | (2006.01) |
| H04W 4/029 | (2018.01) |
| H04W 4/02 | (2018.01) |
| G01C 21/08 | (2006.01) |
| G01S 19/47 | (2010.01) |
| G01C 21/16 | (2006.01) |
| G01S 5/02 | (2010.01) |
| H04W 4/33 | (2018.01) |

(52) U.S. Cl.
CPC ............ *H04W 4/029* (2018.02); *G01C 21/08* (2013.01); *G01C 21/165* (2013.01); *G01S 5/0252* (2013.01); *G01S 19/47* (2013.01); *H04W 4/026* (2013.01); *H04W 4/027* (2013.01); *H04W 4/33* (2018.02)

(58) Field of Classification Search
CPC .... G01C 22/006; G01C 21/3602; G09B 5/02; A61B 5/486; H04W 4/04; H04W 4/028; H04W 24/08; H04W 4/021; H04L 63/302; H04L 67/18
USPC ............... 455/414.1; 701/213, 522, 408, 533
See application file for complete search history.

(56) References Cited

U.S. PATENT DOCUMENTS

| | | | |
|---|---|---|---|
| 2009/0043504 A1* | 2/2009 | Bandyopadhyay | .... G01C 17/38 |
| | | | 701/469 |
| 2015/0281884 A1 | 10/2015 | Smith et al. | |
| 2016/0014554 A1 | 1/2016 | Sen et al. | |
| 2016/0379074 A1 | 12/2016 | Nielsen et al. | |
| 2018/0279067 A1* | 9/2018 | Ivanov | ................. H04B 17/318 |

OTHER PUBLICATIONS

Li et al, IO detector: A generic service for indoor outdoor detection, ACM transactions on sensor networks, vol. 11 No. 2, Article 28.

* cited by examiner

*Primary Examiner* — Phuoc H Doan
(74) *Attorney, Agent, or Firm* — Henry L. Ohab

(57) ABSTRACT

A method and system of localizing a mobile device having a processor and a memory. The method comprises localizing the mobile device along a sequence of positions describing a route being traversed in an indoor facility based on a set of data fusion inputs, monitoring a processing time associated with the localizing and when the processing time exceeds a time threshold, localizing the mobile device based on a subset of the set of data fusion inputs.

20 Claims, 3 Drawing Sheets

300

Localizing, using the processor and the memory, the mobile device along a sequence of positions describing a route being traversed in an indoor facility based on a set of data fusion inputs
310

Monitoring, using the processor, a processing time associated with the localizing
320

When the processing time exceeds a time threshold, localizing the mobile device based on a subset of the set of data fusion inputs
330

FIG. 3

METHOD AND SYSTEM FOR MOBILE DEVICE PROCESSING TIMEOUT BASED LOCALIZATION

TECHNICAL FIELD

The disclosure herein relates to the field of mobile device navigation and positioning.

BACKGROUND

Users of mobile devices, including smartphones, tablets and wearable computing devices, are increasingly using and depending upon indoor positioning and navigation applications and features. Seamless, accurate and dependable indoor positioning of a mobile device as carried or worn by a user can be difficult to achieve using satellite-based navigation systems when the latter becomes unavailable, or sporadically available, and therefore unreliable, such as within enclosed or partially enclosed urban infrastructure and buildings, including hospitals, shopping malls, airports, universities and industrial warehouses. Wireless communication signal data, ambient barometric data, mobile device inertial data and magnetic field data may be measured applied in localizing a mobile device along a route traversed within indoor infrastructure.

BRIEF DESCRIPTION OF THE DRAWINGS

FIG. 3 illustrates, in an example embodiment, a method of localizing a mobile device based on transitioning to a subset of data fusion input parameters.

DETAILED DESCRIPTION

Figure 1:
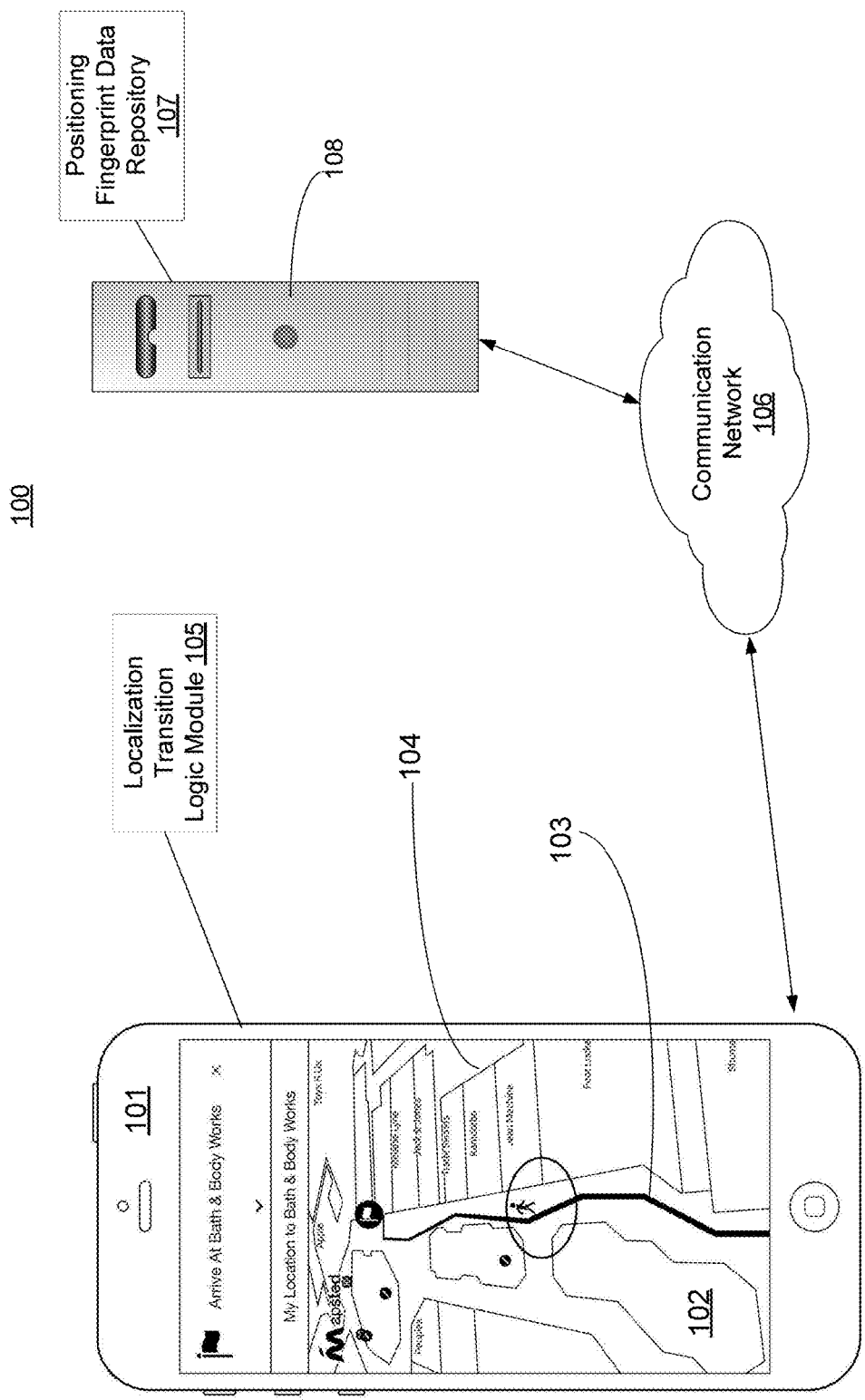
FIG. 1 illustrates, in an example embodiment, a system for localizing a mobile device based on a processing timeout.

Embodiments herein recognize that mobile devices used for indoor navigation must perform with a degree of responsiveness that meets or exceeds user expectations. Among other technical effects and advantages, embodiments herein provide solutions which are directed to using indoor navigation solutions in a manner that enhances responsiveness and timeliness while preserving mobile device resources-usage, such as processor and memory resources, in a most economical manner to preserve longevity of mobile device power in a charged state. Embodiments herein also recognize that, among the various data inputs to user indoor navigation such as wireless signal data, inertial data, magnetic data, barometric and other data, wireless signal data processing consumes predominantly more than the other data input processing, typically by a significant margin. Also, depending on the quality and performance of the particular wireless infrastructure deployed in a building or indoor facility, a lower quality infrastructure may lead to delays in wireless signal processing at the mobile device, and thus delays in localizing the mobile device, to the dissatisfaction of a mobile device user. The latter adverse effect may become even more pronounced in situations where the mobile device is an older type, having a slower processor and a lower amount of random access memory relative to newer mobile devices Embodiments herein provide a method for localizing a mobile device having a processor and a memory. In particular, the method comprises localizing the mobile device along a sequence of positions describing a route being traversed in an indoor facility based on a set of data fusion inputs, monitoring a processing time associated with the localizing, and when the processing time exceeds a time threshold, localizing the mobile device based on a subset of the set of data fusion inputs. The localizing a basis for determining a unique location, or position, of a mobile device in a timely and responsive manner relative to user convenience and expectations while traversing a route or trajectory in two- or three-dimensional space within or near to an indoor facility. The latter process of determining a unique location or position of the mobile device in two- or three-dimensional space is referred to herein as localizing the mobile device, or mobile device localization.

Also provided is a mobile device including a processor and a memory storing a set of computer instructions. The instructions are executable in the processor to localize the mobile device along a sequence of positions describing a route being traversed in an indoor facility based on a set of data fusion inputs, monitor a processing time associated with the localizing and when the processing time exceeds a time threshold, localize the mobile device based on a subset of the set of data fusion inputs.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on non-transitory computer memory mediums.

System Description

FIG. 1 illustrates, in an example embodiment, mobile device localization system 100 including mobile device 101. Mobile device 101 may be such as a cellular or smartphone, a laptop or a tablet computer, or a wearable computer device that is operational for any one or more of telephony, messaging, and data computing. Mobile device 101 may be connected within a computer network system, including the internet or other wide area network, to one or more remote server computing devices 108. Mobile device 101 may include mobile device localization logic module 105, the latter embodied according to computer processor-executable instructions stored within a memory of, or otherwise accessible to a processor of, mobile device 101. In alternate embodiments, it is contemplated that one or more portions of mobile device localization logic module 105 may be stored at the remote server computing device 108, while being communicatively accessible to mobile device 101 via communication network 106.

A navigation, or positioning, software application downloaded and installed, or stored, in a memory of mobile device 101 may render physical layout map 102 related to a facility or building within a user interface display of mobile device 101. In one embodiment, the navigation software application may incorporate mobile device localization logic module 105. The terms indoor facility or building as used herein means an at least partially enclosed building having at least one fixed boundary, such as an exterior boundary wall. Display of physical layout map 102 may further show trajectory or route 103 constituted of a sequence of spatial positions traversed by the mobile device, which may include an estimated trajectory segment predicted for traversal by mobile device 101. Physical layout map 102 may further depict one or more map constraint features 104, such as an internal wall or other map constraint feature including a doorway, a facility exit, a physical marker fixed in place, a facility entrance, a stairwell, a stairway, a corridor, an elevator, and an external boundary outline of the indoor facility.

Positioning fingerprint data repository 107, hosted at a server computing device 108 in one embodiment, may be communicatively accessible to mobile device 101, via communication network 106. In alternate embodiments, positioning fingerprint data repository 107, or any portion(s) thereof, may be stored in a memory of mobile device 101. The terms fingerprint and fingerprint data as used herein refer to time-correlated or time-stamped, individual measurements of any of, or any combination of, received wireless communication signal strength and signal connectivity parameters, magnetic field measurements and barometric pressure measurements, and mobile device inertial sensor data at known, particular locations within an area being traversed, or anticipated for traversal, by the mobile device. In other words, a fingerprint includes a correlation of sensor and signal information including, but not necessarily limited to wireless signal strength, magnetic and barometric data, and inertial sensor information time-correlated for respective positions or coordinate locations within the area or facility being traversed. For instance, barometric fingerprint data associated with contiguous locations or positions may establish a pattern or signature that uniquely correlates to that particular sequence of locations or positions. Once a particular as-measured value, a pattern or signature based on any one or more of received wireless communication signal strength and signal connectivity parameters, magnetic field parameters or barometric pressure parameters, and mobile device inertial sensor data is detected or recorded by mobile device 101, the value or pattern as detected may be matched to a reference fingerprint stored in a fingerprint map of a given facility, for example as stored in positioning fingerprint data repository 107, to identify the unique position of the mobile device relative to the facility, a process also referred to herein as localization. A sequence of positions or locations that constitute a navigation path traversed by mobile device 101 relative to the indoor facility may be mapped for fingerprint data during a fingerprint calibration process. In some embodiments, given that sampling times and sampling rates applied in conjunction with particular mobile device sensors may be different, the signal and sensor information as measured during a fingerprint calibration process may be time-averaged across particular periods of time, with the time-averaged value being used to represent the signal information at any given instance of time within that particular period of time in which the signal information is time-averaged. Fingerprint data may be used to track mobile device 101 traversal along route 103 within, and even adjoining, the indoor facility.

The mobile device wireless signal data including signal strength and connectivity, inertial data, barometric data, magnetic data and other device data may be gathered at positions along a trajectory of motion and used as input parameters for joint fusion with fingerprint location data. In some embodiments, the joint fusion, also referred to as data fusion herein, can be performed using a Bayesian filter, a Kalman filter, a Rodriguez filter, or any suitable method of jointly fusing input data to determine a position of the mobile device, or localize the mobile device, based on the data fusion. Estimating a trajectory of the mobile device in accordance with the data fusion may be based on the wireless signal data, inertial data, barometric data, magnetic data and other device data may include such as, but not limited to, instantaneous inertial sensor measurements including directional heading and step length, short-term inertial sensor measurement history within a specified time window, WI-FI received signal strength and connectivity measurements, Bluetooth received signal strength measurements, barometric-based pressure data, magnetic field data including field strength and direction, floor layout map physical constraints such as doors, walls and entryways, environment landmarks, cellular communication signal strengths and GPS signal data.

Figure 2:
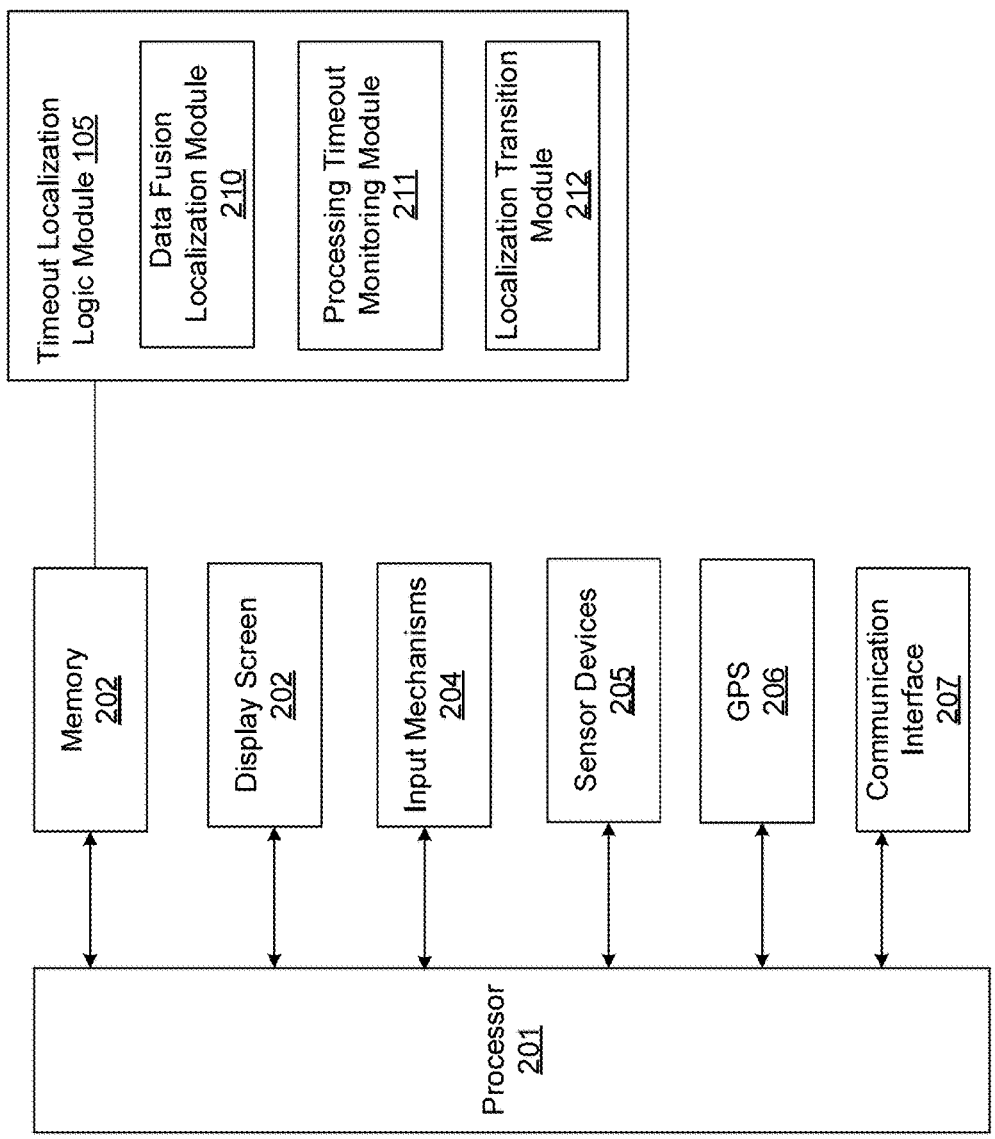
FIG. 2 illustrates, in one example embodiment, an architecture of a mobile device embodying a processing timeout localization transition.

FIG. 2 illustrates an architecture of mobile device 101 for operation using a processing-time sensitive approach for localization, in one embodiment. Mobile device 101 may include processor 201, memory 202, display screen 203, input mechanisms 204 such as a keyboard or software-implemented touchscreen input functionality, barcode, QR code or other symbol- or code-scanner input functionality. Mobile device 101 may include sensor functionality by way of sensor devices 205. Sensor devices 205 may include inertial sensors such as an accelerometer and a gyroscope, magnetometer or other magnetic field sensing functionality, barometric or other ambient pressure sensing functionality, and ambient lighting sensors, such as to detect ambient lighting intensity.

Mobile device 101 may also include capability for detecting and communicatively accessing ambient wireless communication signals including but not limited to any of Bluetooth and Bluetooth Low Energy (BLE), WI-FI, RFID, and also satellite-based navigations signals including global positioning system (GPS) signals. Mobile device 101 further includes the capability for detecting, via sensor devices 205, and measuring a received signal strength, and of determining signal connectivity parameters, related to the ambient wireless signals. In particular, mobile device 101 may include location determination capability such as by way of GPS module 206 having a GPS receiver, and communication interface 207 for communicatively coupling to communication network 106, including by sending and receiving cellular data over data and voice channels.

Mobile device localization logic module 105 includes instructions stored in memory 202 of mobile device 101. In embodiments, mobile device localization logic module 105 may be included in a mobile device navigation application program stored in memory 202 of mobile device 101. The term indoor location as used herein refers to a location within the facility or building, such as within a shopping mall, an airport, a warehouse, a university campus, or any at least partially enclosed building. Mobile device localization logic module 105 may comprise sub-modules including data fusion localization module 210, processing timeout monitoring module 211 and localization transition module 212.

Processor 201 uses executable instructions stored in data fusion localization module 210 to localize the mobile device 101 along a sequence of positions describing a route being traversed in an indoor facility based on a set of data fusion inputs. Processor 201 executes instructions included in data fusion localization module 210, to localize, using the processor and the memory, the mobile device along a sequence of positions describing a route being traversed in an indoor facility based on a set of data fusion inputs. The positions or locations may be expressed in accordance with either a local or global (X, Y, Z) coordinate system.

In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

The set of data fusion inputs may include wireless signal data and inertial sensor data, and also barometric data, magnetic data and map feature data of the indoor facility. The map feature data may be layout map data pertaining to physical details and constraints such as walls, corridors, landmarks, doorways and stairs or elevators within the building or indoor facility. The localizing may be performed in conjunction with accessing a fingerprint data repository 107 associated with the indoor facility. Data repository 107 may be hosted at remote server 108, or at portions thereof may be downloaded into local memory 202 of mobile device 101.

In one embodiment, the wireless signal data comprises at least one of WI-FI signal data, Bluetooth signal data, cellular communication data and Global Positioning System (GPS) data.

In another embodiment, the inertial sensor data may be acquired at mobile device 101 using one or more of gyroscope and an accelerometer of the mobile device 101. Magnetic data may also be gathered using a magnetometer at mobile device 101, providing magnetic data based on measurements such as magnetic field strength, direction, and magnetic dip angle.

Processor 201 uses executable instructions stored in processing timeout monitoring module 211 to monitor, using the processor 210, a processing time associated with the localizing.

Processor 201 uses executable instructions stored in localization transition module 212 to localize mobile device 101, when the processing time exceeds a time threshold, based on only a subset of the set of data fusion inputs.

In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

In an embodiment, the subset of data fusion inputs may excludes at least the wireless signal data, as the latter may be the most resources-intensive, in terms of memory and processor resources required, mobile device power-intensive, and processing time-intensive inputs relative to inertial data, barometric data, magnetic data and other sensor data inputs to the data fusion process in localizing mobile device 101.

In embodiments, the fingerprint data of repository 107 may be accessible in memory 202 of mobile device 101, and also accessible from a server computing device 108 via wireless communication network 106.

In some embodiments, the time threshold may be manually adjustable at a user interface of mobile device 101, such as a display user interface, or automatically adjustable by an indoor navigation application that includes localization transition logic module 105 during execution of the application by processor 201. In one embodiment, the time threshold may be set manually or automatically set as least 1 second or other time duration designed to provide a responsive experience to a user of an indoor navigation application that includes localization transition logic module 105 at mobile device 101.

Methodology

FIG. 3 illustrates, in an example embodiment, a method of localizing a mobile device based on transitioning to only a subset of data fusion input parameters. In describing examples of FIG. 3, reference is made to the examples of FIGS. 1-2 for purposes of illustrating suitable components or elements for performing a step or sub-step being described.

Examples of method steps described herein relate to the use of mobile device 101 for implementing the techniques described. According to one embodiment, the techniques are performed by mobile device localization logic module 105 of mobile device 101 in response to the processor 201 executing one or more sequences of software logic instructions that constitute mobile device localization logic module 105. In embodiments, mobile device localization logic module 105 may include the one or more sequences of instructions within sub-modules including data fusion localization module 210, processing timeout monitoring module 211 and localization transition module 212. Such instructions may be read into memory 202 from machine-readable medium, such as memory storage devices. In executing the sequences of instructions contained in data fusion localization module 210, processing timeout monitoring module 211 and localization transition module 212 of mobile device localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between the mobile device 101 and a remote server computing device 108. For example, the mobile device may collect and transmit data to the server 108 that, in turn, performs at least some portion of the techniques described herein.

At step 410, processor 201 executes instructions included in data fusion localization module 210, to localize, using the processor and the memory, the mobile device along a sequence of positions describing a route being traversed in an indoor facility based on a set of data fusion inputs. The positions or locations may be expressed in accordance with either a local or global (X, Y, Z) coordinate system.

In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

The set of data fusion inputs may include wireless signal data and inertial sensor data, and also barometric data, magnetic data and map feature data of the indoor facility. The map feature data may be layout map data pertaining to physical details and constraints such as walls, corridors, landmarks, doorways and stairs or elevators within the building or indoor facility. The localizing may be performed in conjunction with accessing a fingerprint data repository 107 associated with the indoor facility. Data repository 107 may be hosted at remote server 108, or at portions thereof may be downloaded into local memory 202 of mobile device 101.

In one embodiment, the wireless signal data comprises at least one of WI-FI signal data, Bluetooth signal data, cellular communication data and Global Positioning System (GPS) data.

In another embodiment, the inertial sensor data may be acquired at mobile device 101 using one or more of gyroscope and an accelerometer of the mobile device 101. Magnetic data may also be gathered using a magnetometer at mobile device 101, providing magnetic data based on measurements such as magnetic field strength, direction, and magnetic dip angle.

At step 420, processor 201 executes instructions included in processing timeout monitoring module 211 to monitor, using the processor 201, a processing time associated with the localizing.

At step 430, processor 201 executes further instructions included in localization transition module 212 to, when the processing time exceeds a time threshold, localize the mobile device based on a subset of the set of data fusion inputs.

In embodiments, the fingerprint map data stored in fingerprint data repository 107 (also referred to herein as repository 107) further associates respective positions along route 103 within the area or facility with a unique combination of fingerprint data, including gyroscope data, accelerometer data, wireless signal strength data, wireless connectivity data, barometric data, acoustic data, line-of sight data, ambient lighting data, and magnetic data.

In an embodiment, the subset of data fusion inputs excludes at least wireless signal data, since the latter may be the most resources-intensive, in terms of memory and processor resources required, mobile device power-intensive, and processing time-intensive inputs relative to inertial data, barometric data, magnetic data and other sensor data inputs to the data fusion process in localizing mobile device 101.

In embodiments, the data of repository 107 may be accessible in memory 202 of mobile device 101, and also accessible from a server computing device 108 via wireless communication network 106.

In some embodiments, the time threshold may be manually adjustable at a user interface of mobile device 101, or automatically adjustable by an indoor navigation application that includes localization transition logic module 105 using processor 201. In one embodiment, the time threshold may be set manually or automatically set as least 1 second or other time duration designed to provide a responsive experience to a user of an indoor navigation application that includes localization transition logic module 105 at mobile device 101.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for operating a mobile device having a processor and a memory, the method comprising:
   localizing, using the processor and the memory, the mobile device along a sequence of positions describing a route being traversed in an indoor facility based on a set of data fusion inputs, the set of data fusion inputs provided in accordance with data acquired from a plurality of sensor devices of the mobile device;
   monitoring, using the processor, a processing time associated with the localizing;
   using the processor, when the processing time exceeds a time threshold, transitioning to a subset of the set of data fusion inputs, the subset of the set of data inputs excluding data acquired from at least one of the plurality of sensor devices; and
   using the processor, localizing the mobile device based on the subset of the set of data fusion inputs.

2. The method of claim 1 wherein the set of data fusion inputs include at least wireless signal data and inertial sensor data.

3. The method of claim 2 wherein the set of data fusion inputs further includes barometric data, magnetic data and map feature data of the indoor facility.

4. The method of claim 2 wherein the subset of data fusion inputs excludes at least one of the wireless signal data and the barometric data.

5. The method of claim 2 wherein the wireless signal data comprises at least one of WI-FI signal data, Bluetooth signal data, cellular communication data and Global Positioning System (GPS) data.

6. The method of claim 2 wherein the inertial sensor data is based on at least one of gyroscope and an accelerometer of the mobile device.

7. The method of claim 2 wherein the magnetic data comprises at least one of a magnetic field strength and direction.

8. The method of claim 1 wherein the localizing is performed at least in part in conjunction with accessing a fingerprint data repository associated with the indoor facility.

9. The method of claim 1 wherein the time threshold is one of manually adjustable at a user interface of the mobile device and automatically adjustable by an indoor navigation application using the processor.

10. The method of claim 9 wherein the time threshold is at least 1 second.

11. A mobile device comprising:
a processor; and
a memory storing a set of instructions, the instructions executable in the processor to:
localize the mobile device along a sequence of positions describing a route being traversed in an indoor facility based on a set of data fusion inputs, the set of data fusion inputs provided in accordance with data acquired from a plurality of sensor devices of the mobile device;
monitor a processing time associated with the localizing;
when the processing time exceeds a time threshold, transition to a subset of the set of data fusion inputs; the subset of the set of data inputs excluding data acquired from at least one of the plurality of sensor devices;
localize the mobile device based on the subset of the set of data fusion inputs.

12. The mobile device of claim 11 wherein the set of data fusion inputs include at least wireless signal data and inertial sensor data.

13. The mobile device of claim 12 wherein the set of data fusion inputs further includes barometric data, magnetic data and map feature data of the indoor facility.

14. The mobile device of claim 12 wherein the subset of data fusion inputs excludes at least one of the wireless signal data and the barometric data.

15. The mobile device of claim 12 wherein the wireless signal data comprises at least one of WI-FI signal data, Bluetooth signal data, cellular communication data and Global Positioning System (GPS) data.

16. The mobile device of claim 12 wherein the inertial sensor data is based on at least one of gyroscope and an accelerometer of the mobile device.

17. The mobile device of claim 12 wherein the magnetic data comprises at least one of a magnetic field strength and direction.

18. The mobile device of claim 11 wherein the localizing is performed at least in part in conjunction with accessing a fingerprint data repository associated with the indoor facility.

19. The mobile device of claim 11 wherein the time threshold is one of manually adjustable at a user interface of the mobile device and automatically adjustable by an indoor navigation application using the processor.

20. The mobile device of claim 19 wherein the time threshold is at least 1 second.

\* \* \* \* \*